(12) United States Patent
Sosnin et al.

(10) Patent No.: US 10,623,909 B2
(45) Date of Patent: Apr. 14, 2020

(54) USER EQUIPMENT POSITIONING USING PRSS FROM A PLURALITY OF TRPS IN A 5G-NR NETWORK

(71) Applicant: Intel Corporation, Santa Clara, CA (US)

(72) Inventors: Sergey Sosnin, Zavolzhie (RU); Alexey Khoryaev, Nizhny Novgorod (RU); Sergey Panteleev, Nizhny Novgorod (RU); Mikhail Shilov, Nizhny Novgorod (RU); Dmitry Belov, Nizhny Novgorod (RU); Gang Xiong, Beaverton, OR (US); Hwan-Joon Kwon, Portland, OR (US); Yushu Zhang, Beijing (CN); Yongjun Kwak, Portland, OR (US); Seunghee Han, San Jose, CA (US); Alexander Sirotkin, Tel-Aviv (IL); Candy Yiu, Portland, OR (US); Carlos Aldana, Santa Clara, CA (US); Qian Li, Beaverton, OR (US); Youn Hyoung Heo, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/295,356

(22) Filed: Mar. 7, 2019

(65) Prior Publication Data

US 2019/0208366 A1    Jul. 4, 2019

Related U.S. Application Data

(60) Provisional application No. 62/641,136, filed on Mar. 9, 2018, provisional application No. 62/648,747, filed (Continued)

(51) Int. Cl.
*H04W 4/00* (2018.01)
*H04W 4/029* (2018.01)
(Continued)

(52) U.S. Cl.
CPC ........... *H04W 4/029* (2018.02); *G01S 13/765* (2013.01); *G01S 13/876* (2013.01); *G01S 13/878* (2013.01)

(58) Field of Classification Search
CPC .... H04W 4/029; G01S 13/765; G01S 13/876; G01S 13/878
See application file for complete search history.

(56) References Cited

U.S. PATENT DOCUMENTS

2019/0150003 A1 * 5/2019 He .................. H04B 7/0617
342/368

FOREIGN PATENT DOCUMENTS

WO    WO-2018069208 A1 *    4/2018    .............. G01S 11/06

OTHER PUBLICATIONS

"3rd Generation Partnership Project; Technical Specification Group Radio Access Network; Study on indoor positioning enhancements for UTRA and LTE", 3GPP TR 37.857 V13.1.0 (Release 13), (Dec. 2015), 82 pgs.
(Continued)

*Primary Examiner* — Khai M Nguyen
(74) *Attorney, Agent, or Firm* — Schwegman Lundberg & Woessner, P.A.

(57) ABSTRACT

Embodiments of a Next Generation Node-B (gNB) and User Equipment (UE) are generally described herein. The gNB may transmit control signaling to configure transmission of position reference signals (PRSs) by a plurality of transmit-receive points (TRPs). The gNB may receive, from the UE, for each of the TRPs, a set of signal location parameters (SLPs). The gNB may perform an iterative process to
(Continued)

estimate a position of the UE. For a current iteration, the gNB may: determine a current estimate of the position of the UE based on a current plurality of sets of SLPs; and determine a cost function for each of the current plurality of sets of SLPs. The gNB may determine, based on the cost functions, a next plurality of sets of SLPs for a next estimate of the position of the UE.

20 Claims, 18 Drawing Sheets

Related U.S. Application Data on Mar. 27, 2018, provisional application No. 62/664,482, filed on Apr. 30, 2018, provisional application No. 62/669,854, filed on May 10, 2018, provisional application No. 62/737,495, filed on Sep. 27, 2018.

(51) Int. Cl.
*G01S 13/87* (2006.01)
*G01S 13/76* (2006.01)

(56) References Cited

OTHER PUBLICATIONS

Foy, Wade H, "Position-Location Solutions by Taylor-Series Estimation", IEEE Transactions on Aerospace and Electronic Systems vol. AES-12, No. 2, (Mar. 1976), 187-194.

\* cited by examiner

1300

1600

1700

USER EQUIPMENT POSITIONING USING PRSS FROM A PLURALITY OF TRPS IN A 5G-NR NETWORK

PRIORITY CLAIM

This application claims priority under 35 USC 119(e) to U.S. Provisional Patent Application Ser. No. 62/641,136, filed Mar. 9, 2018, and to United States Provisional Patent Application Ser. No. 62/648,747, filed Mar. 27, 2018, and to U.S. Provisional Patent Application Ser. No. 62/664,482, filed Apr. 30, 2018, and to U.S. Provisional Patent Application Ser. No. 62/669,854, filed May 10, 2018, and to U.S. Provisional Patent Application Ser. No. 62/737,495, filed Sep. 27, 2018, all of which are incorporated herein by reference in their entirety.

TECHNICAL FIELD

Embodiments pertain to wireless networks. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to user positioning.

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
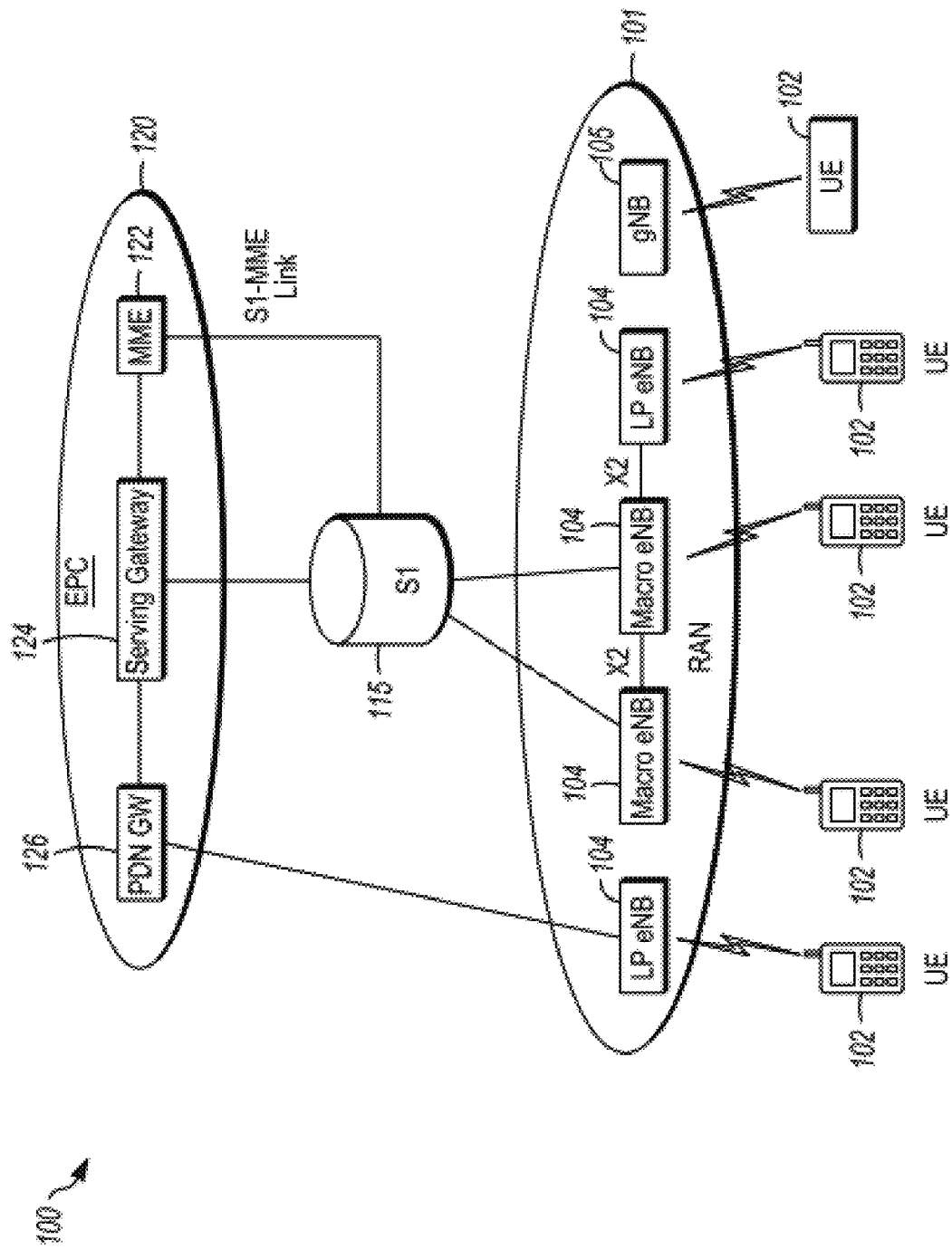
FIG. 1A is a functional diagram of an example network in accordance with some embodiments.
Figure 1B:
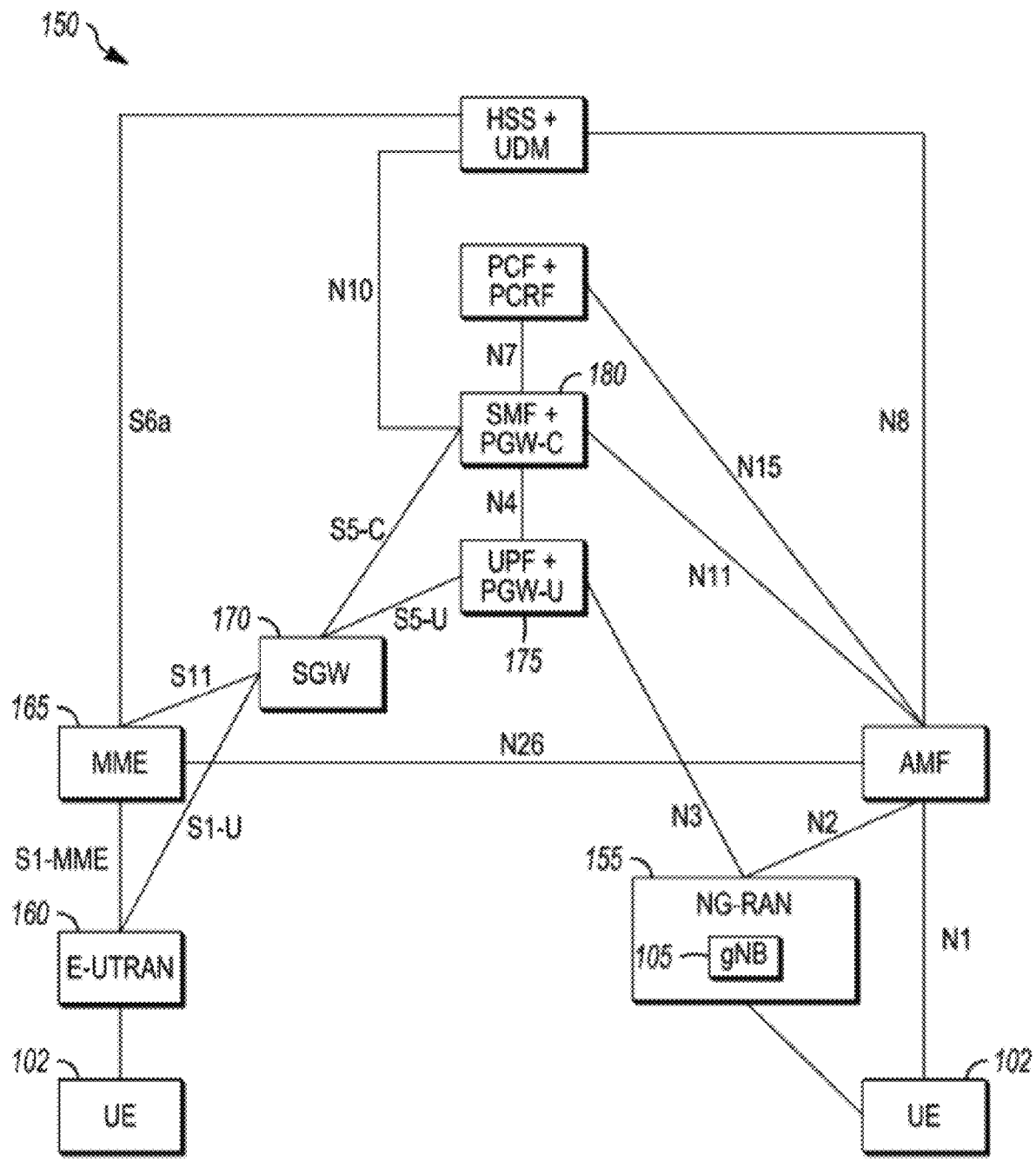
FIG. 1B is a functional diagram of another example network in accordance with some embodiments.
Figure 1C:
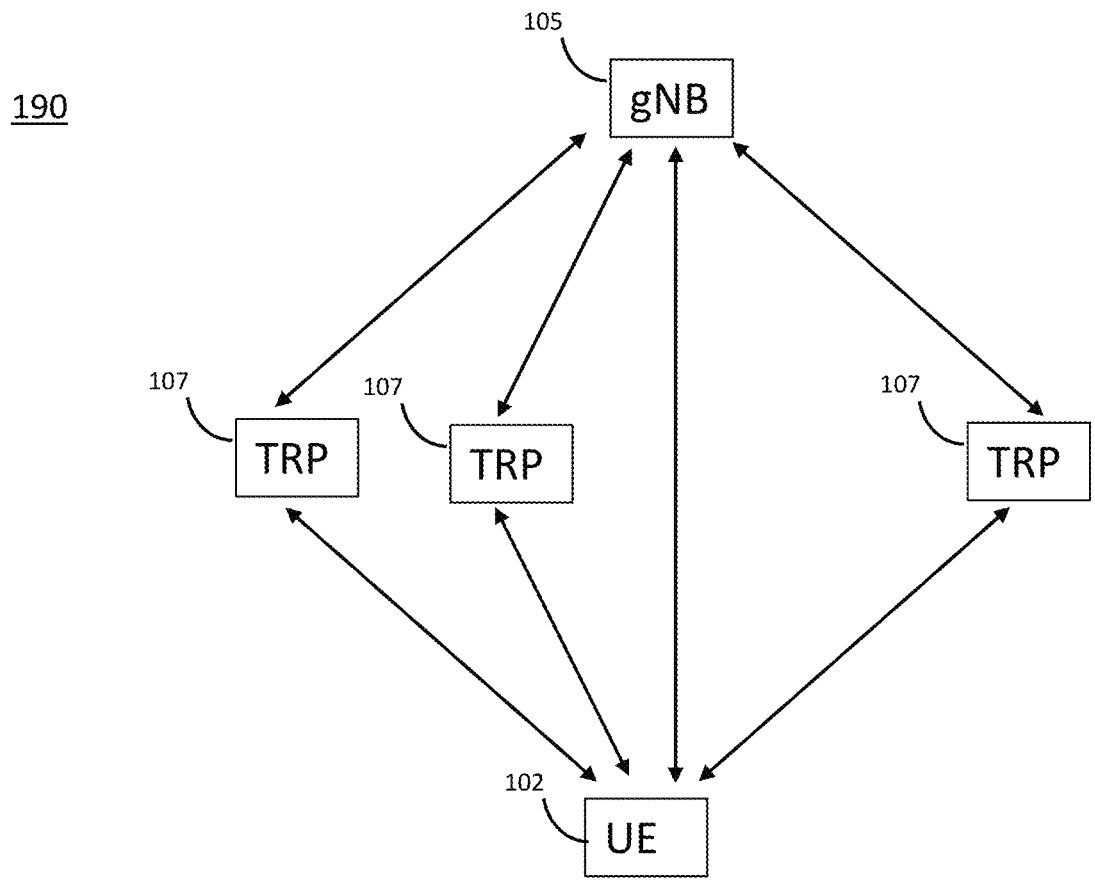
FIG. 1C is a functional diagram of another example network in accordance with some embodiments.

FIG. 1A is a functional diagram of an example network in accordance with some embodiments. FIG. 1B is a functional diagram of another example network in accordance with some embodiments. FIG. 1C is a functional diagram of another example network in accordance with some embodiments. In references herein, "FIG. 1" may include FIG. 1A and FIG. 1B and FIG. 1C. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

In some embodiments, a network may include one or more components shown in FIG. 1C. Some embodiments may not necessarily include all components shown in FIG. 1C, and some embodiments may include additional components not shown in FIG. 1C. In some embodiments, a network may include one or more components shown in FIG. 1A, one or more components shown in FIG. 1B, and/or one or more components shown in FIG. 1C. In some embodiments, a network may include one or more components shown in FIG. 1A, one or more components shown in FIG. 1B, one or more components shown in FIG. 1C, and/or one or more other components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) 107 and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, gNBs 105, and/or eNBs 104 may be configured to operate in accordance with an NR protocol and/or NR techniques. References to a UE 102, eNB 104, and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In FIG. 1C, the example network 190 includes a gNB 105 and one or more transmit-receive points (TRPs) 107. It should be noted that the components shown in FIG. 1C may not necessarily comprise an entire network. One or more of the components shown in FIG. 1C may be included in another network (including but not limited to one of the networks shown in FIG. 1A and/or FIG. 1B). The networks shown in FIG. 1A and FIG. 1B may be extended to include one or more TRPs 107, in some embodiments. Embodiments are not limited to the number or type of components shown in FIG. 1C. Embodiments are also not limited to the connectivity of components shown in FIG. 1C.

In some embodiments, the gNB 105 may communicate with the one or more TRPs 107. In some embodiments, the one or more TRPs 107 may transmit signals to the UE 102 and/or receive signals from the UE 102. In some embodiments, the gNB 105 may transmit control signaling to the one or more TRPs 107, wherein the control signaling may indicate information related to transmission of one or more signals to the UE 102. In a non-limiting example, the gNB 105 may transmit control signaling to the one or more TRPs 107, wherein the control signaling may indicate information related to coordinated transmission of signals by one or more TRPs 107 to the UE 102. Non-limiting examples related to FIG. 1C are described elsewhere herein.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical downlink control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
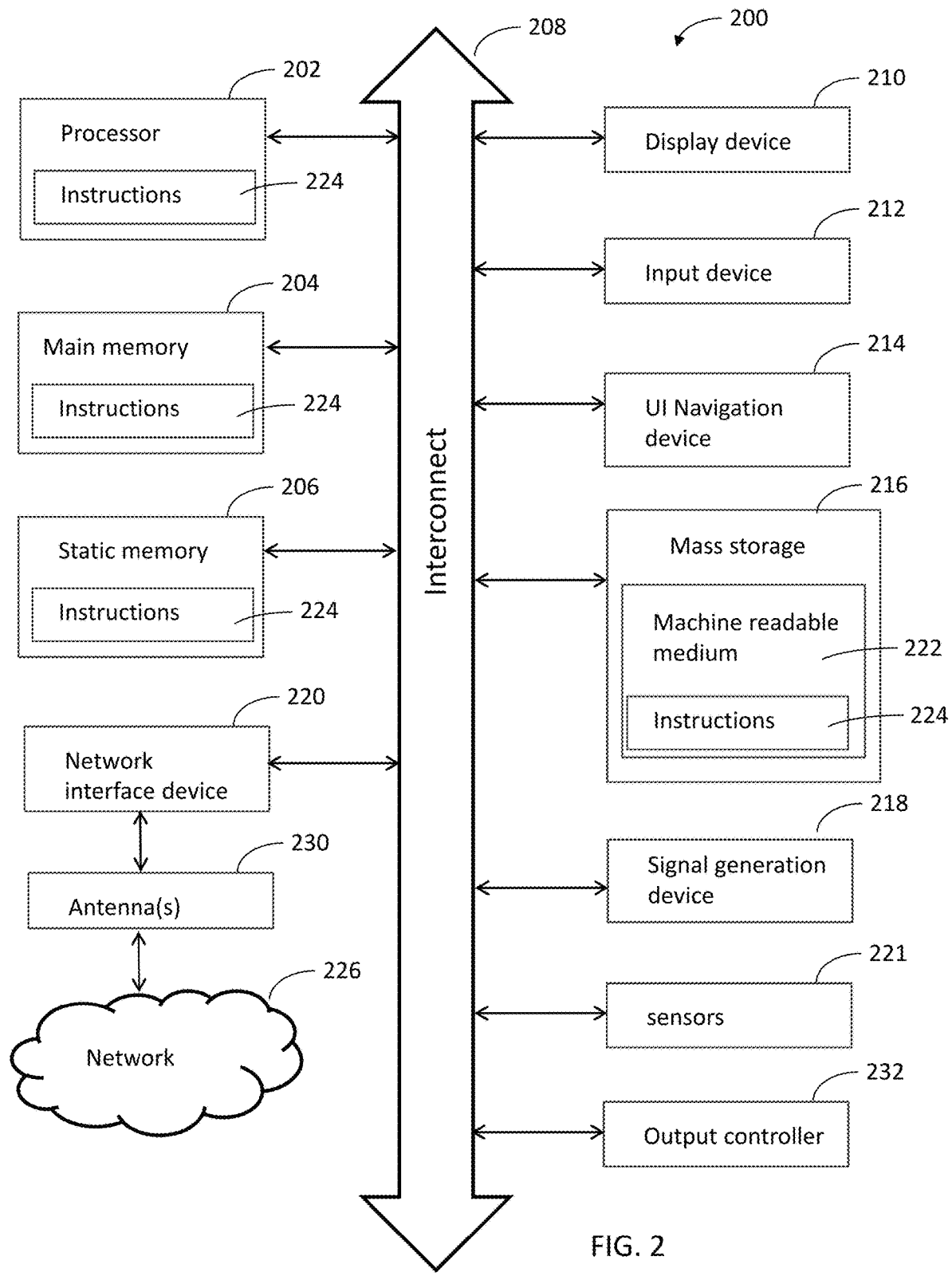
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
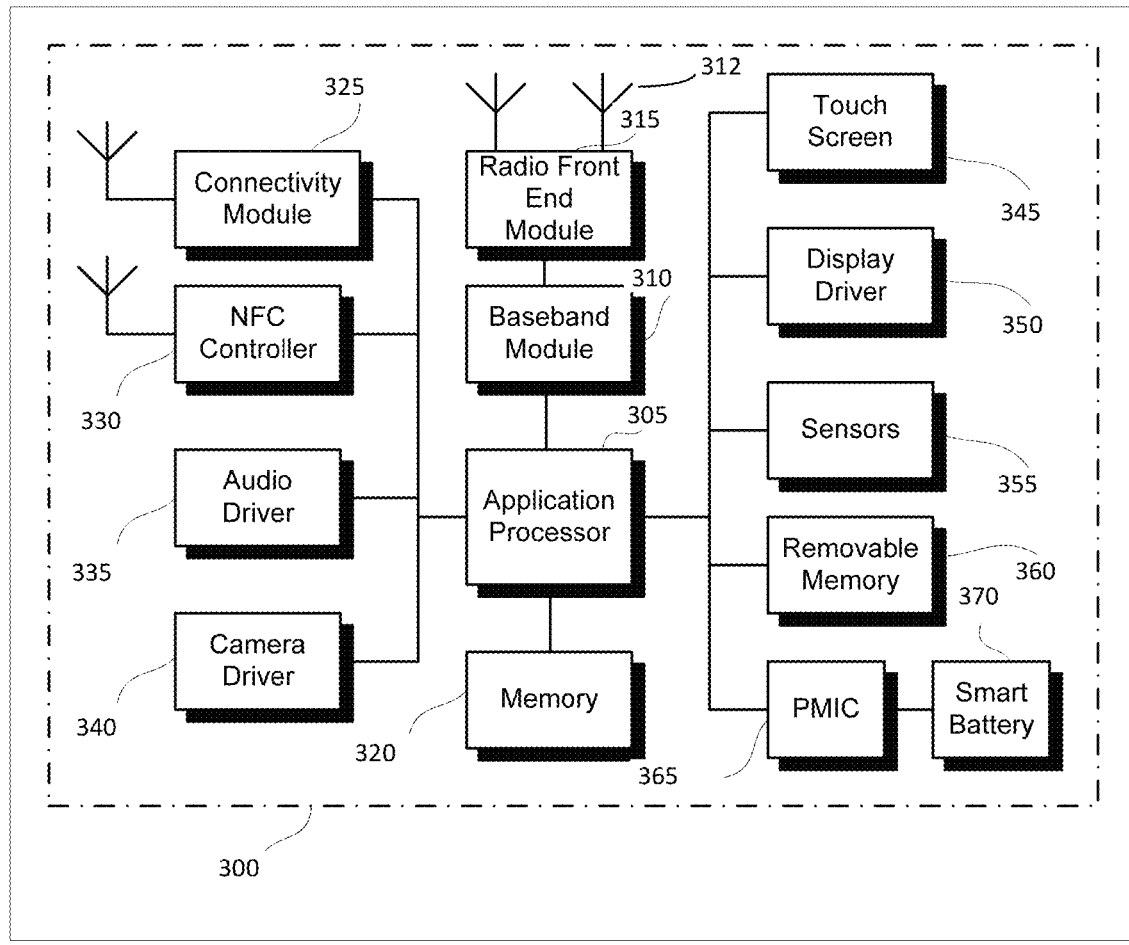
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
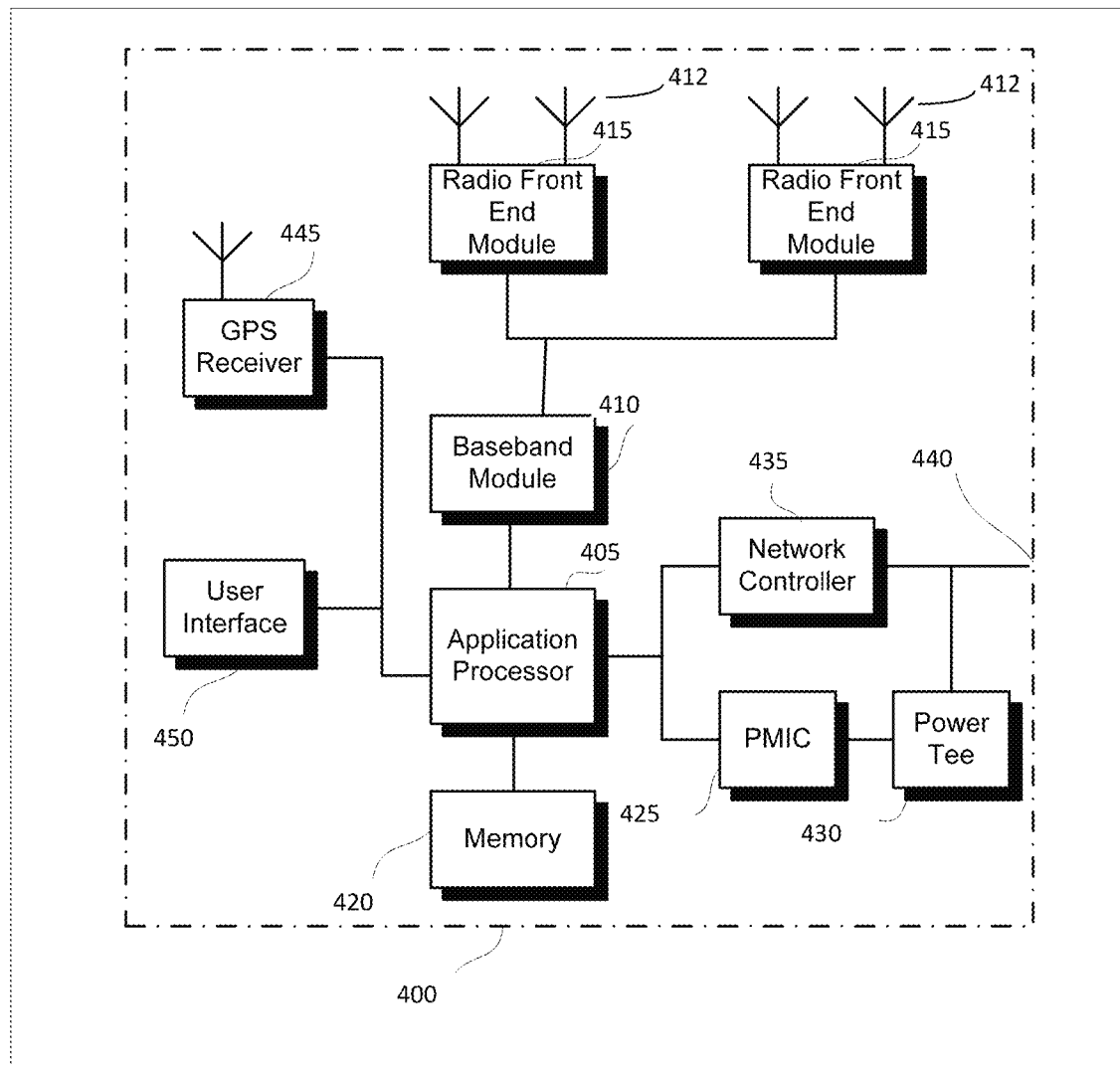
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
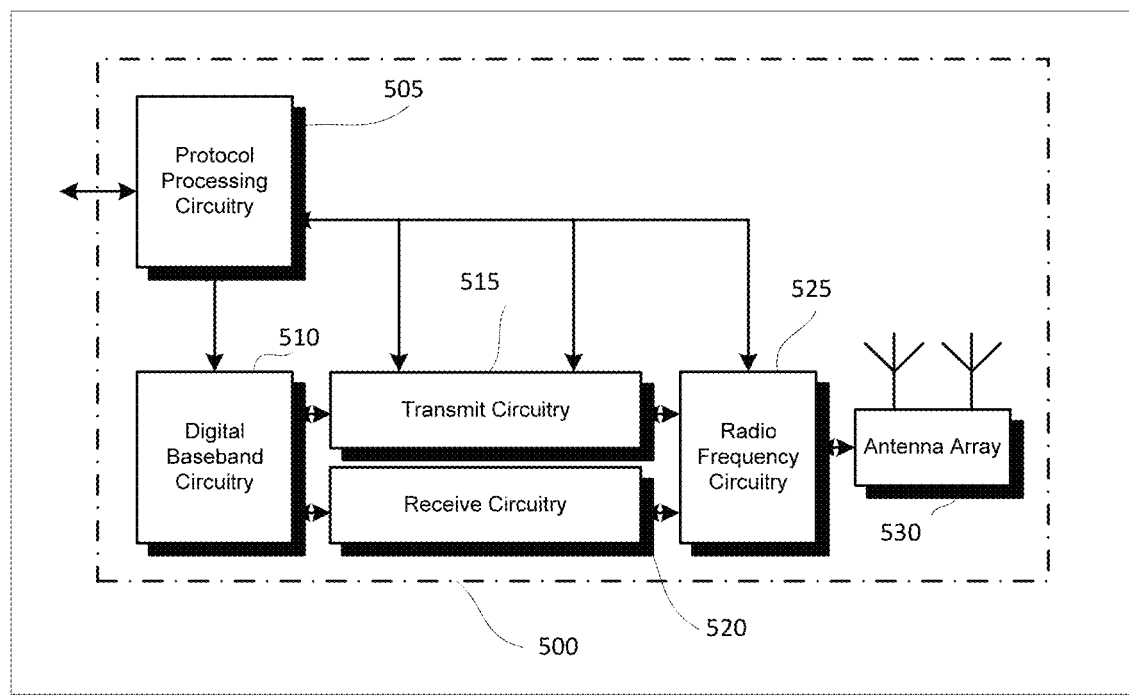
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARM) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
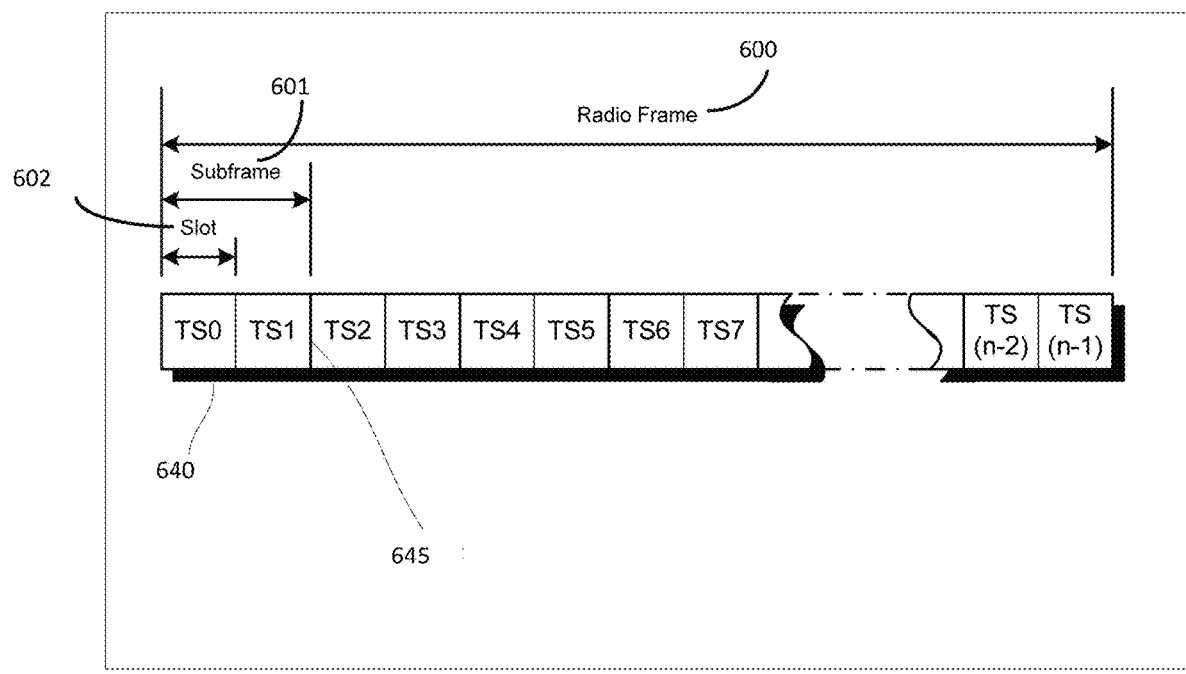
FIG. 6 illustrates an example of a radio frame structure in accordance with some embodiments.
Figures 7A, 7B:
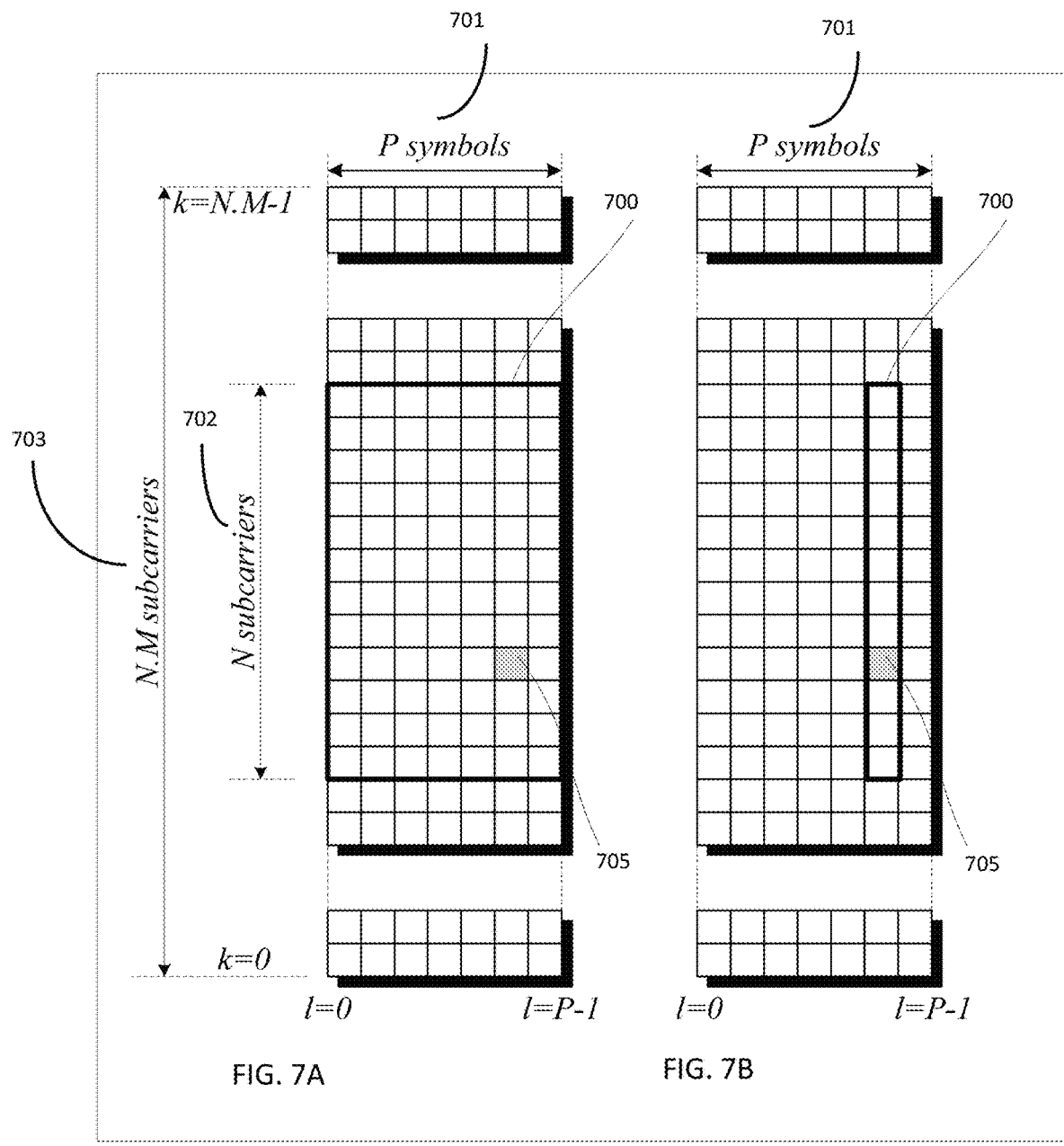
FIG. 7A and FIG. 7B illustrate example frequency resources in accordance with some embodiments.

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a sub-component of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, l) where k is the index number of subcarrier, in the range 0 to N.M-1 (as indicated by 703), where N is the number of subcarriers in a resource block, and M is the number of resource blocks spanning a component carrier in the frequency domain.

In accordance with some embodiments, the gNB 105 may transmit control signaling to configure transmission of position reference signals (PRSs) by a plurality of transmit-receive points (TRPs) 107. The gNB 105 may receive, from a UE 102, one or more measurement reports that include sets of signal location parameters (SLPs), a set of SLPs for each of the TRPs 107. Each of the sets of SLPs may include an estimated propagation delay of one of the PRSs to the corresponding TRP 107. The gNB 105 may perform an iterative process to estimate a position of the UE 102. For a current iteration of the iterative process, the gNB 105 may determine a current estimate of the position of the UE 102 based on a current plurality of the sets of SLPs. For the current iteration of the iterative process, the gNB 105 may, for each of the sets of SLPs of the current plurality of the sets of SLPs, determine a cost function that compares: a distance based on a position of the corresponding TRP 107 and the current estimate of the position of the UE 102, and a distance based solely on the estimated propagation delay included in the set of SLPs. The gNB 105 may, for a next iteration of the iterative process, determine a next plurality of the sets of SLPs to be used to determine a next estimate of the position of the UE 102. The next plurality of the sets of SLPs may exclude, from the current plurality of the sets of SLPs, the set of SLPs for which the cost function is maximum. These embodiments are described in more detail below.

Figure 8:
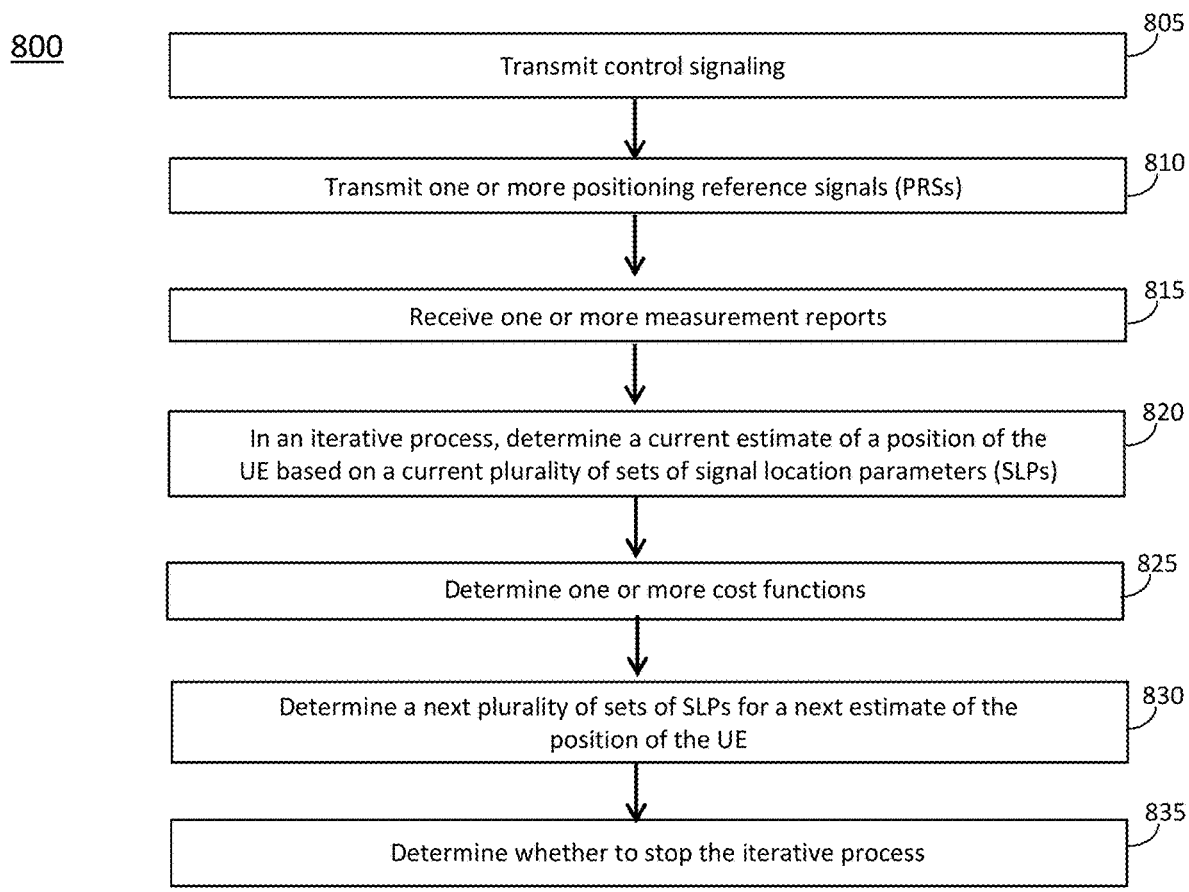
FIG. 8 illustrates the operation of a method of communication in accordance with some embodiments.
Figure 9:
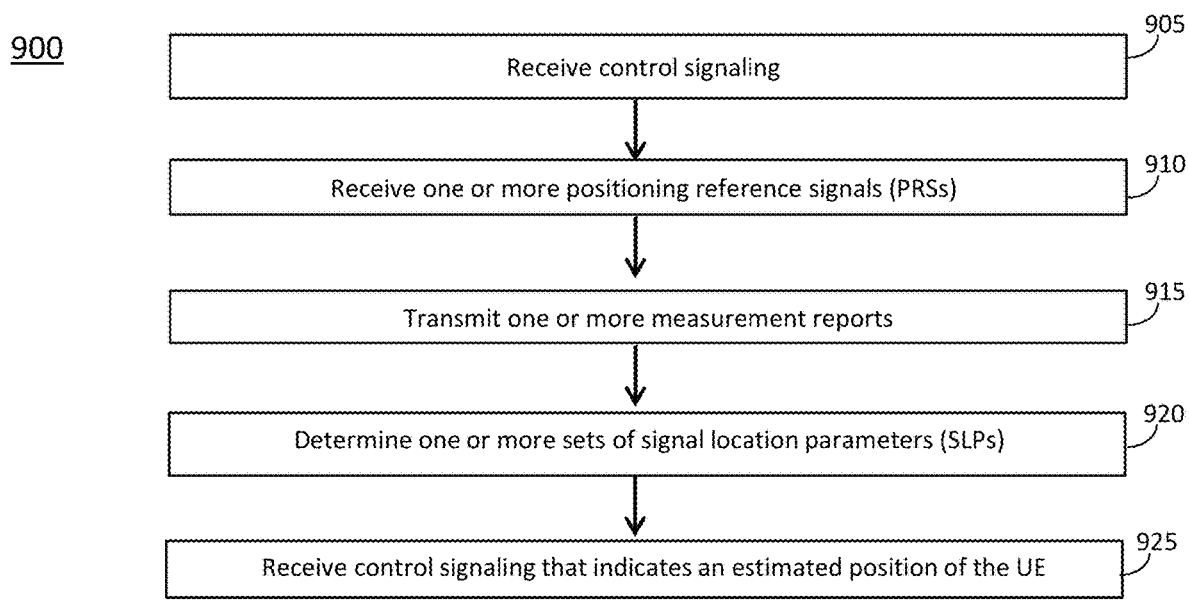
FIG. 9 illustrates the operation of another method of communication in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In describing the methods 800, 900, reference may be made to one or more figures, although it is understood that the methods 800, 900 may be practiced with any other suitable systems, interfaces and components.

In some embodiments, a gNB 105 may perform one or more operations of the method 800, but embodiments are not limited to performance of the method 800 and/or operations of it by the gNB 105. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the UE 102 may perform an operation that may be the same as, similar to, reciprocal to and/or related to an operation of the method 800, in some embodiments.

In some embodiments, a UE 102 may perform one or more operations of the method 900, but embodiments are not limited to performance of the method 900 and/or operations of it by the UE 102. In some embodiments, another device and/or component may perform one or more operations of the method 900. In some embodiments, another device and/or component may perform one or more operations that may be similar to one or more operations of the method 900. In some embodiments, another device and/or component may perform one or more operations that may be reciprocal to one or more operations of the method 900. In a non-limiting example, the gNB 105 may perform an operation that may be the same as, similar to, reciprocal to and/or related to an operation of the method 900, in some embodiments.

It should be noted that one or more operations of one of the methods 800, 900 may be the same as, similar to and/or reciprocal to one or more operations of the other method. For instance, an operation of the method 800 may be the same as, similar to and/or reciprocal to an operation of the method 900, in some embodiments. In a non-limiting example, an operation of the method 800 may include transmission of an element (such as a frame, block, message and/or other) by the gNB 105, and an operation of the method 900 may include reception of a same element (and/or similar element) by the UE 102. In some cases, descriptions of operations and techniques described as part of one of the methods 800, 900 may be relevant to the other method.

Discussion of various techniques and concepts regarding one of the methods 800, 900 and/or other method may be applicable to one of the other methods, although the scope of embodiments is not limited in this respect. Such technique and concepts may include TRPs 107, PRSs, SLPs, cost functions, iterative processes, and/or other.

The methods 800, 900 and other methods described herein may refer to eNBs 104, gNBs 105 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 800, 900 and other methods described herein may be practiced by wireless devices configured to operate in other suitable types of wireless communication systems, including systems configured to operate according to various IEEE standards such as IEEE 802.11. The methods 800, 900 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of elements that are included in standards, however.

In some embodiments, the gNB 105 may be arranged to operate in accordance with a new radio (NR) protocol, although the scope of embodiments is not limited in this respect. In some embodiments, the gNB 105 may be arranged to operate in accordance with one or more of: an NR protocol, a Fifth Generation (5G) protocol, a 3GPP protocol and/or other protocol. In some embodiments, the UE 102 may be arranged to operate in accordance with an NR protocol, although the scope of embodiments is not limited in this respect. In some embodiments, the UE 102 may be arranged to operate in accordance with one or more of: an NR protocol, a 5G protocol, a 3GPP protocol and/or other protocol.

At operation 805, the gNB 105 may transmit control signaling. In some embodiments, the control signaling may configure transmission of position reference signals (PRSs) by a plurality of transmit-receive points (TRPs) 107. In some embodiments, the control signaling may configure transmission of PRSs by one or more TRPs 107. In some embodiments, the control signaling may configure transmission of PRSs by the gNB 105 and/or by one or more TRPs 107.

In some embodiments, the control signaling may configure transmission of PRSs by multiple TRPs 107, on multiple transmit beams or a combination thereof. In some embodiments, the control signaling may configure one or more of: transmission of PRSs by multiple TRPs 107, transmission of the PRSs on multiple transmit beams, reception of the PRSs on multiple receive beams and/or other.

In some embodiments, the control signaling may configure transmission of the PRSs on multiple transmit antenna ports for at least one of the TRPs 107.

In some embodiments, the control signaling may configure transmission of the PRSs in accordance with multiple multiple-input multiple-output (MIMO) transmit pre-coders for at least one of the TRPs 107 and/or reception of the PRSs in accordance with multiple MIMO receive pre-coders.

In some embodiments, the control signaling may configure one or more of the following and/or a combination of two or more of the following: transmission of PRSs by multiple TRPs 107, transmission of PRSs on multiple transmit beams, transmission of PRSs on multiple transmit antenna ports, transmission of PRSs in accordance with multiple transmit pre-coders, transmission of PRSs in accordance with multiple MIMO transmit pre-coders, reception of PRSs from multiple TRPs 107, reception of PRSs on multiple receive beams, reception of PRSs on multiple receive antenna ports, reception of PRSs in accordance with multiple receive pre-coders, reception of PRSs in accordance with multiple MIMO receive pre-coders and/or other.

In some embodiments, the control signaling may include information related to one or more of: transmission of one or more PRSs, resource(s) (such as time, frequency, code and/or other) for such transmission, transmit beams for the PRSs, transmit pre-coder(s) for the PRSs, receive beams for the PRSs, receive pre-coders for the PRSs, signal location parameters (SLPs), sets of SLPs, TRPs 107, TRP identifiers, time stamps, time stamps based on transmission times of the PRSs, frequency stamps, frequency stamps based on transmission frequencies of the PRSs, spatial domain stamps, spatial domain stamps based on spatial multiplexing of the PRSs, code identifiers (IDs), code IDs of the PRSs and/or other.

In some embodiments, the control signaling may include information to configure the PRSs in accordance with one or more of: time stamps based on transmission times of the PRSs; frequency stamps based on transmission frequencies of the PRSs; spatial domain stamps based on spatial multiplexing of the PRSs; code identifiers (IDs) of the PRSs; and/or other.

In some embodiments, the control signaling may configure coordinated orthogonal transmission of the PRSs by the TRPs 107. For instance, the orthogonal transmission may be related to orthogonality in the time domain, orthogonality in the frequency domain, orthogonality in the spatial domain (including but not limited to spatial multiplexing), orthogonality of codes and/or other.

At operation 810, the gNB 105 may transmit one or more PRSs. In some embodiments, the gNB 105 and one or more TRPs 107 may transmit one or more PRSs. In some embodiments, the gNB 105 may not necessarily transmit PRSs, and the PRSs may be transmitted by one or more TRPs 107. It should be noted that some descriptions herein may refer to one or more techniques, operation and/or methods in which the PRSs are transmitted by one or more TRPs 107, but not necessarily transmitted by the gNB 105. The scope of embodiments is not limited in this respect, however. Such techniques, operations and/or methods may be extended to include transmission of one or more PRSs by the gNB 105 also.

At operation 815, the gNB 105 may receive one or more measurement reports. In some embodiments, the gNB 105 may receive the one or more measurement reports from the UE 102, although the scope of embodiments is not limited in this respect.

In some embodiments, the one or more measurement reports may include one or more signal location parameters (SLPs). Embodiments are not limited to usage of measurement reports, as the gNB 105 may receive the SLPs in any suitable message(s), frame(s) or element(s) in some embodiments.

In some embodiments, the one or more measurement reports may include sets of SLPs. The sets may include one or more SLPs. Any suitable number of sets may be used, and various arrangements are possible. In some embodiments, the one or more measurement reports may include a set of SLPs for each of the TRPs 107. In some embodiments, the one or more measurement reports may include, for each TRP 107 or transmit beam, a set of SLPs based on the PRSs.

In some embodiments, the one or more measurement reports may include a set of SLPs for each aspect and/or combination of aspects configured by the control signaling. For instance, if multiple transmit beams are configured for transmission of the PRSs from one of the TRPs 107, a set of SLPs for each of the transmit beams for that TRP 107 may be included in the one or more measurement reports. This concept may be extended to other aspects (such as transmit antenna ports, receive beams, receive antenna ports, MIMO transmit pre-coders, MIMO receive pre-coders and/or other), in some embodiments.

Non-limiting examples of SLPs include a propagation delay between a TRP 107 and the UE 102, a round-trip delay, a time-of-flight (TOF), a phase difference between one of the PRSs and a reference signal, a time of arrival of one or more of the PRSs, a time difference of arrival between two of the PRSs, an angle of arrival of one or more of the PRS, a received reference signal power (RSRP) of one or more of the PRSs, estimate(s) of one or more of the above, information related to a position of the UE 102 and/or other information.

At operation 820, the gNB 105 may determine a current estimate of a position of the UE 102 based on a current plurality of sets of SLPs. At operation 825, the gNB 105 may determine one or more cost functions. At operation 830, the gNB 105 may determine a next plurality of sets of SLPs for a next estimate of the position of the UE 102. At operation 835, the gNB 105 may determine whether to stop the iterative process.

One or more of operations 820-835 may be performed as part of an iterative process, although the scope of embodiments is not limited in this respect. In some embodiments, the iterative process may be performed to determine an estimate of a position of the UE 102. In some embodiments, one or more of operations 820-835 may be performed multiple times. For instance, operations 820-835 may be repeated until it is determined (at operation 835) that the iterative process is to stop.

It should be noted that the terms "current" and "next" are used for clarity, but the scope of embodiments is not limited by this terminology. Other terminology may be used, including first/second and/or other.

In some embodiments, for a current iteration of the iterative process, the gNB 105 may determine a current estimate of the position of the UE 102 based on a current plurality of the sets of SLPs.

In some embodiments, for the current iteration of the iterative process, the gNB 105 may determine the current estimate of the position of the UE based on sets of SLPs, wherein the sets of SLPs may correspond to different aspects (and/or combinations of aspects), including but not limited to: TRPs 107, transmit beams, transmit antenna ports, receive beams, receive antenna ports, MIMO transmit pre-coders, MIMO receive pre-coders and/or other.

In some embodiments, the gNB 105 may, for each of the sets of SLPs of the current plurality of the sets of SLPs, determine a cost function. In a non-limiting example, the cost function for one of the sets of SLPs may compare: a distance based on a position of the corresponding TRP 107 (associated with the set of SLPs) and the current estimate of the position of the UE 102; and a distance based on an estimated propagation delay included in the set of SLPs (for instance, a distance based on a product of the estimated propagation delay and a speed of light). The technique given above for determination of the cost function may be performed for each of the sets of SLPs of the current plurality of the sets of SLPs. Embodiments are not limited to this example, as other cost functions are possible.

In another non-limiting example, for a set of SLPs that includes an estimate of a time difference of arrival of a first PRS from a reference TRP 107 and a second PRS from the corresponding TRP 107, the gNB 105 may determine the cost function for the set of SLPs based on a difference between: a first distance between the current estimate of the position of the UE 102 and the reference TRP 107, a second distance between the current estimate of the position of the UE 102 and the corresponding TRP 107, and a product of the estimate of the time difference of arrival and a speed of light.

In some embodiments, for a next iteration of the iterative process, the gNB 105 may determine a next plurality of the sets of SLPs to be used to determine a next estimate of the position of the UE 102. In some embodiments, the next plurality of the sets of SLPs may exclude, from the current plurality of the sets of SLPs, the set of SLPs for which the cost function is maximum. In some embodiments, the next plurality of the sets of SLPs may exclude, from the current plurality of the sets of SLPs, one or more sets of SLPs (including but not limited to the sets of SLPs with highest cost functions in comparison to the sets of SLPs not excluded).

In some embodiments, the sets of SLPs of the next plurality of the sets of SLPs may be included in the current plurality of the sets of SLPs. The next plurality of the sets of SLPs may exclude, from the current plurality of the sets of SLPs, the set of SLPs for which the cost function is maximum, In some embodiments, the gNB 105 may, based on the cost functions, reduce a number of the sets of SLPs used to determine the next estimate of the position of the UE 102 in comparison to a number of the sets of SLPs used to determine the current estimate of the position of the UE 102.

In some embodiments, the gNB 105 may determine the next plurality of sets of SLPs for a next estimate of the position of the UE 102 in a next iteration of the iterative process, although the scope of embodiments is not limited in this respect.

In some embodiments, during a first iteration of the iterative process, the current plurality of the sets of SLPs may include all of the sets of SLPs included in the one or more measurement reports, although the scope of embodiments is not limited in this respect. In some embodiments, during the first iteration of the iterative process, the current plurality of the sets of SLPs may include one or more of the sets of SLPs included in the one or more measurement reports.

In some embodiments, for the current iteration of the iterative process, the gNB 105 may determine whether to terminate the iterative process and to output the current estimate of the position of the UE 102 based on a comparison between: a threshold; and a difference between a first sum of cost functions and a second sum of cost functions. The first sum of cost functions may be a sum of cost functions of the current plurality of the sets of SLPs. The second sum of cost functions may be a sum of cost functions of another plurality of the sets of SLPs that was used to determine an estimate of the position of the UE 102 during a previous iteration of the iterative process.

In some embodiments, for the current iteration of the iterative process, the gNB 105 may determine to terminate the iterative process and to output the current estimate of the position of the UE 102 as the position of the UE 102 if: a number of sets of SLPs in the current plurality of the sets of SLPs is equal to a first threshold, a number of base stations that support the TRPs 107 corresponding to the sets of SLPs in the current plurality of the sets of SLPs is equal to a second threshold, a preconfigured number of iterations is used in the iterative process and/or other.

In some embodiments, an apparatus of a gNB 105 may comprise memory. The memory may be configurable to store information related to the sets of SLPs. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding of control signaling. The apparatus may include a transceiver to transmit the control signaling. The transceiver may transmit and/or receive other blocks, messages and/or other elements.

At operation 905, the UE 102 may receive control signaling. At operation 910, the UE 102 may receive one or more PRSs. At operation 915, the UE 102 may transmit one or more measurement reports. At operation 920, the UE 102 may determine one or more sets of SLPs. At operation 925, the UE 102 may receive control signaling that indicates an estimate of a position of the UE 102.

In some embodiments, the UE 102 may receive, from the gNB 105, control signaling that indicates information related to PRSs from multiple TRPs 107 or on multiple transmit beams. In some embodiments, the UE 102 may determine, for each receive beam of a plurality of receive beams, for each TRP 107, and for each transmit beam: a set of SLPs based on one or more received PRSs. In some embodiments, the UE 102 may transmit, to the gNB 105, one or more measurement reports that indicate the sets of SLPs. In some embodiments, the UE 102 may receive, from the gNB 105, control signaling that indicates a position of the UE 102 based on the sets of SLPs.

In some embodiments, an apparatus of a UE 102 may comprise memory. The memory may be configurable to store information related to one or more sets of SLPs. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to encoding of one or more measurement reports. The apparatus may include a transceiver to transmit the one or more measurement reports. The transceiver may transmit and/or receive other blocks, messages and/or other element.

Figure 10:
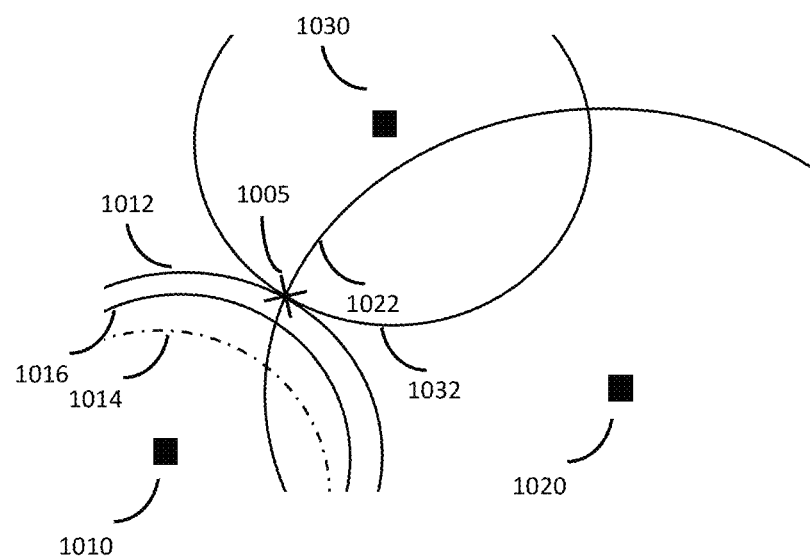
FIG. 10 illustrates an example scenario in accordance with some embodiments.
Figure 11:
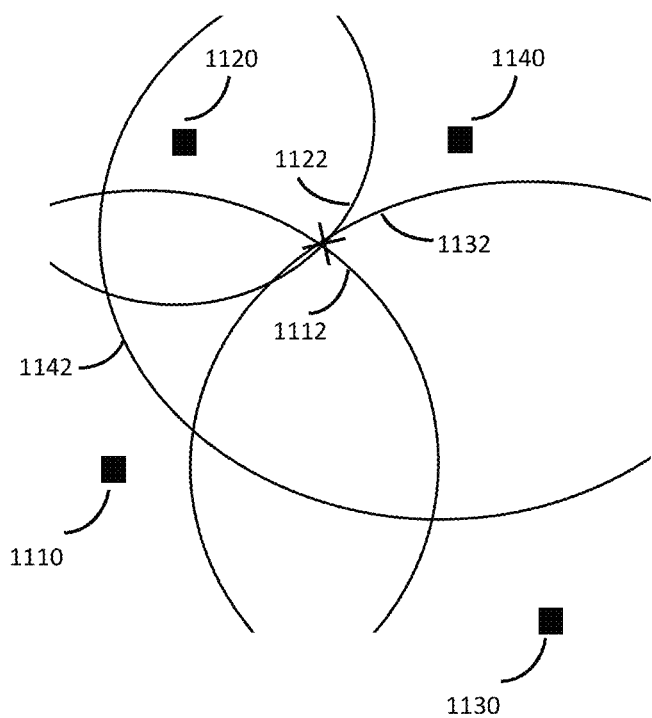
FIG. 11 illustrates another example scenario in accordance with some embodiments.
Figure 12:
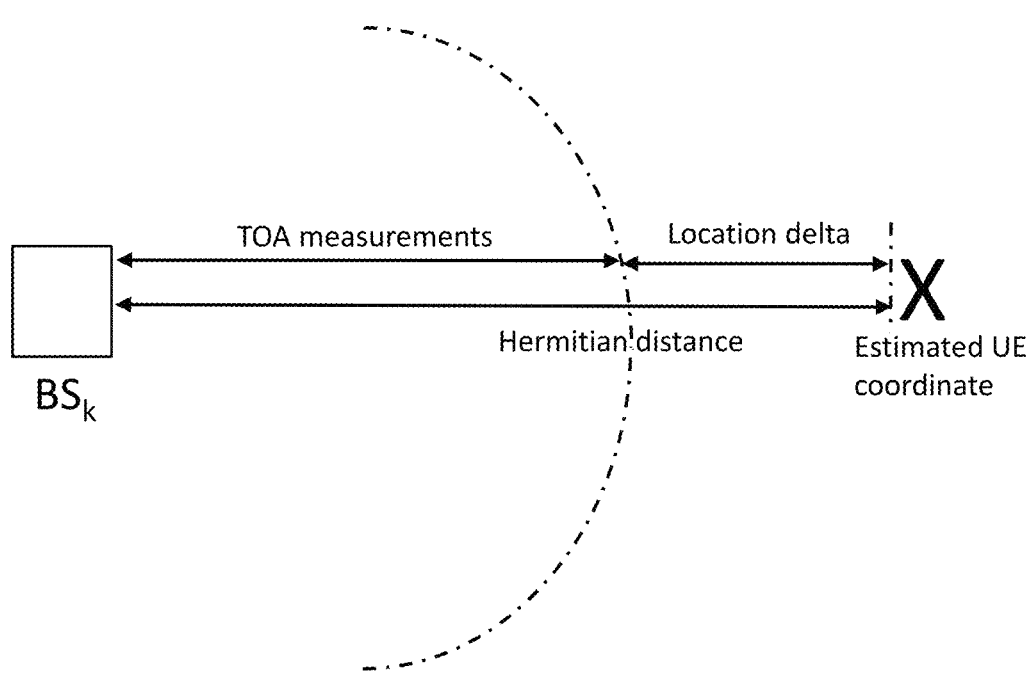
FIG. 12 illustrates example another example scenario in accordance with some embodiments.
Figure 13:
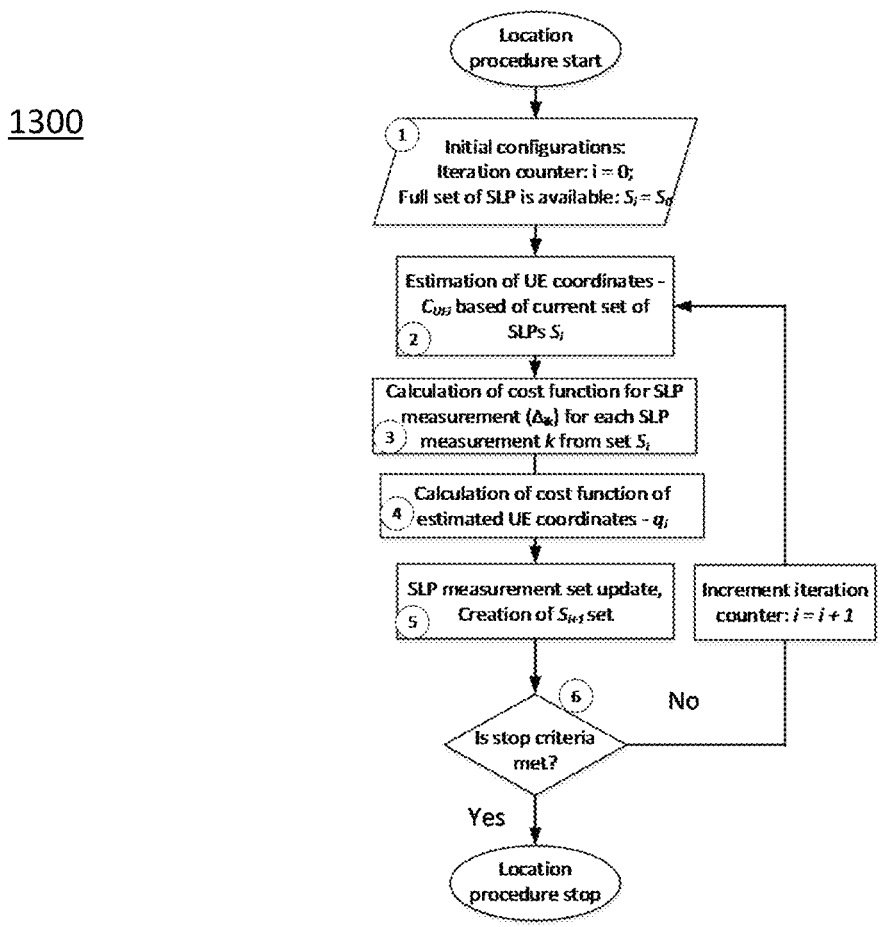
FIG. 13 illustrates example operations in accordance with some embodiments.
Figure 14:
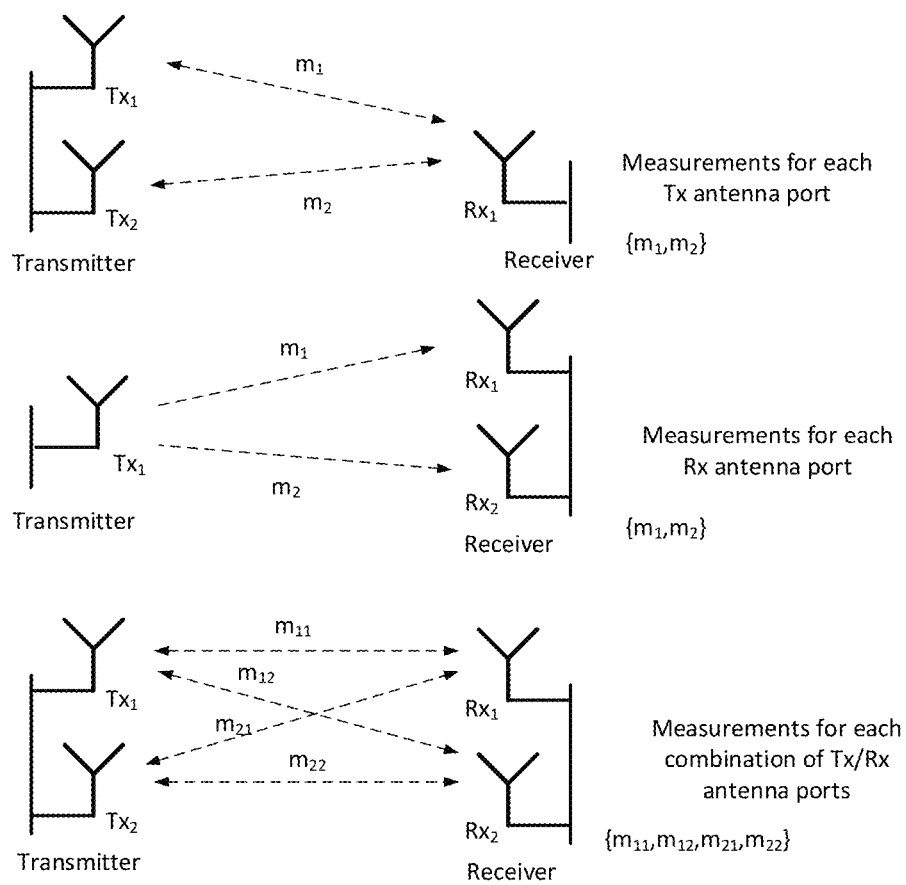
FIG. 14 illustrates example measurements for different combinations of transmit and receive ports in accordance with some embodiments.
Figure 15:
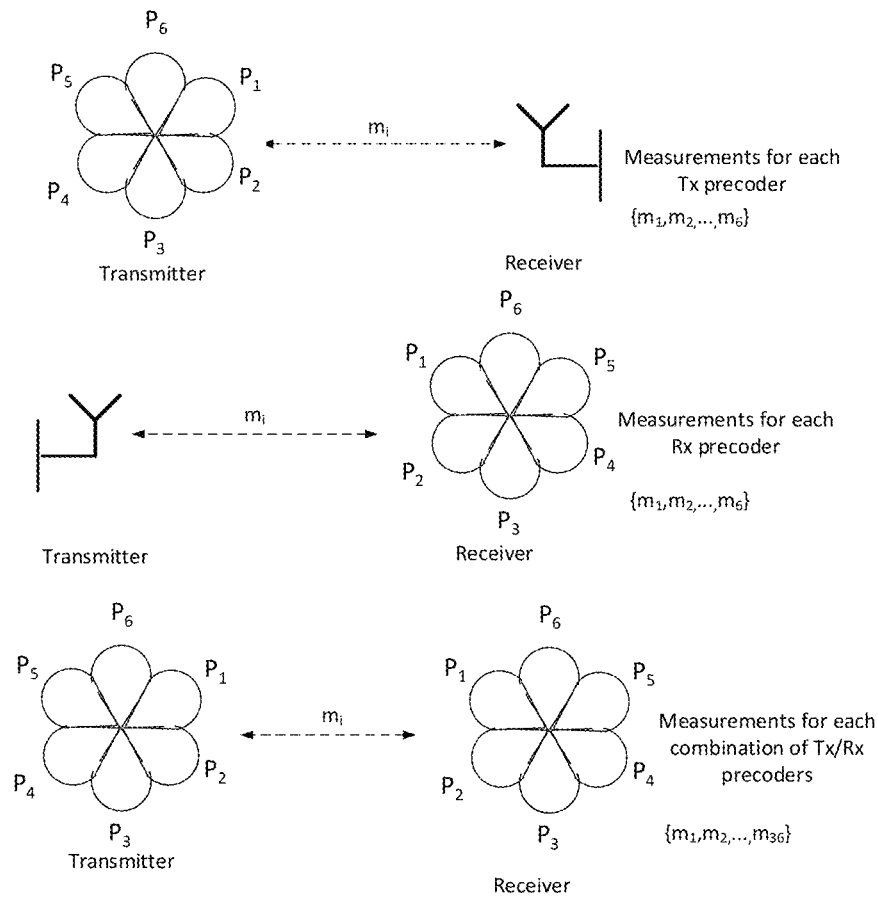
FIG. 15 illustrates example measurements for different combinations of transmit and receive pre-coders in accordance with some embodiments.
Figure 16:
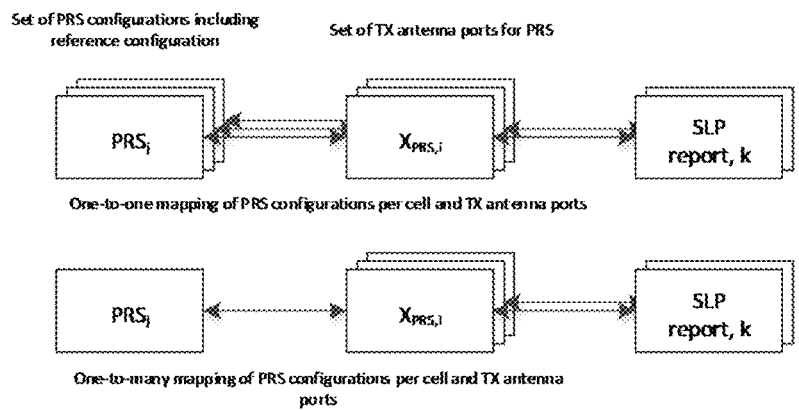
FIG. 16 illustrates an example relation between positioning reference signal (PRS) configurations, antenna ports and signal location parameter (SLP) reports in accordance with some embodiments.
Figure 17:
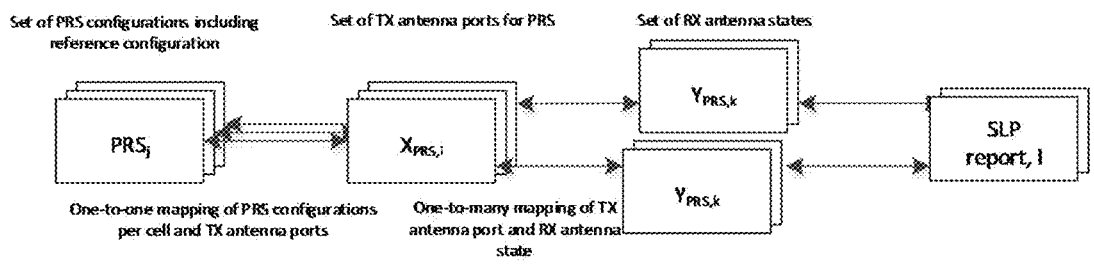
FIG. 17 illustrates an example relation between PRS configurations, transmit antenna ports, receive antenna states, and SLP reports in accordance with some embodiments.

FIG. 10 illustrates an example scenario in accordance with some embodiments. FIG. 11 illustrates another example scenario in accordance with some embodiments. FIG. 12 illustrates example another example scenario in accordance with some embodiments. FIG. 13 illustrates example operations in accordance with some embodiments. FIG. 14 illustrates example measurements for different combinations of transmit and receive ports in accordance with some embodiments. FIG. 15 illustrates example measurements for different combinations of transmit and receive pre-coders in accordance with some embodiments. FIG. 16 illustrates an example relation between positioning reference signal (PRS) configurations, antenna ports and signal location parameter (SLP) reports in accordance with some embodiments. FIG. 17 illustrates an example relation between PRS configurations, transmit antenna ports, receive antenna states, and SLP reports in accordance with some embodiments.

It should be noted that the examples shown in FIGS. 10-17 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 10-17. Although some of the elements shown in the examples of FIGS. 10-17 may be included in a 3GPP LTE standard, 5G standard, NR standard and/or other standard, embodiments are not limited to usage of such elements that are included in standards.

In some embodiments, methods of user positioning in wireless communication networks may be used. The methods may be applicable for the next generation cellular systems (such as for example 3GPP LTE R16+ and 3GPP NR R16+ and/or other) and other communication networks. The proposed methods can be generalized to any type of wireless communication network. The proposed methods may aim to improve the accuracy and reliability/confidence of user location. A principle behind one or more of the proposed methods is to optimize the utilization of multiple positioning measurements between BS and a user aiming to verify the validity of estimated coordinate and identify non-reliable/accurate sources of signal location parameter (SLP) estimates. The methods may include location algorithm(s) and/or measurements that may increase the accuracy of estimated coordinates by enhanced and iterative processing of available measurements of SLP.

In some embodiments, a location algorithm may utilize some or all positioning measurements from UE-BS link. Once an initial coordinate is obtained, the algorithm may apply an iterative self-check procedure to determine reference sources and measurements that have the largest error in terms of location metric.

In some embodiments, signal location parameters (SLP) are parameters of the signal that can be applied for the purpose of user positioning such as phase difference, time of arrival, time difference of arrival, propagation time/delays, angle of arrivals/departures, received reference signal powers and/or any other information that can be relevant to facilitate estimate of UE geographical coordinate.

In some embodiments, positioning reference signals (PRS) are signals sent by cells/eNB 104/gNB 105/TRPs 107/Network Entities used to measure SLP, which may be used to determine UE location. In some embodiments, the PRSs could be specifically designed sequences and signals (which may have good cross-correlation and/or autocorrelation properties, in some cases) and/or a data transmission which may depend on implementation, measurement type, reporting type and/or other aspect(s).

In some embodiments, a reference resource is a resource in which a PRS is transmitted. In some embodiments, the PRS(s) may be characterized by stamp/ID. In some embodiments, the stamp/ID may be configured by higher layer signaling. In some embodiments, the stamp/ID may be configured to the UE 102 for measurement and/or reporting.

For instance, one or more of the following ID(s) may be used. In some embodiments, a time stamp/ID (i.e. measured time location) may be based on a time window to be reported (may be configured, but also possibly to report UE autonomous reporting by means of a new time index, SFN, slot number, and/or symbol index, etc.). In some embodiments, a frequency stamp/ID (i.e. measured frequency location for different carrier frequencies and/or different frequency within the given channel bandwidth) may be used. In some embodiments, a TX/RX port stamp/ID (i.e. measured spatial domain information) may be used. In some embodiments, a code ID (including but not limited to a sequence or signal ID describing or associated with the specific PRS) may be used.

Some location algorithms may utilize all measurements of SLP to estimate user location. During estimation of SLP, such as for example Time of Arrival (TOA) measurements, several measurements can be collected. For example, several RX/TX antennas can be used to produce TOA measurements. The example 1000 in FIG. 10 depicts a case in which TOA measurements from 3 BSs (1010, 1020, and 1030) are available. The position of the UE 102 is indicated by 1005. Measurements 1022 and 1032 are shown for BSs 1020 and 1030, respectively. The UE 102 and BS 1010 have two different TOA measurements (1012 and 1014). The average of the two measurements 1012 and 1014 is shown as 1016. The TOA measurement 1012 is more accurate than the TOA measurement 1014, in this case. In some approaches, these two measurements 1012, 1014 are combined/fused and the resulting measurement of SLP is reported to the location server to determine user coordinate. It is possible that error due to measurement 1014 may be inherited during combining and may lead to increased error in estimated UE 102 coordinate. The latter can be avoided if UE-BS1 distance measurement 1012 is used instead of combining on UE 102 side that results in a loss of information. In some cases, techniques proposed herein may be able to cope with such cases.

The example 1100 in FIG. 11 depicts a case in which TOA measurements from 4 BSs (1110, 1120, 1130, 1140) are available. The measurements 1112, 1122, 1132, and 1142 are associated with the BSs 1110, 1120, 1130, and 1140, respectively. The position of the UE 102 is indicated by 1105. The measurement 1142 from BS 1140 is not as accurate as the measurements 1112, 1122, and 1132. In some cases, the location procedure for the UE 102 may be biased by such inaccuracies. In some cases, techniques proposed herein may be able to reduce the influence of inaccurate positioning measurement(s) on the resulting calculated UE coordinate.

In another example, a location server has a set of SLP measurements for UE-BS links. The measurement and measurement quality metrics can be signaled but instantaneous error may be relatively high and unknown to the server. In some cases, the location server may not necessarily determine the actual quality of the measurements, which may result in a significant/increased positioning error. In some cases, techniques described herein may enable a procedure to estimate the instantaneous measurements quality during position calculation and exclude sources with potentially high measurement error to reduce the overall user positioning accuracy.

In some cases, a plurality of positioning measurements are available for each UE-BS link, for example several RX antennas or several configurations of beamforming (TX ports) can provide different measurements. In some embodiments, these measurements can be independently signaled and processed by the location procedure. The location procedure may start from user positioning by utilizing all weighted measurements by getting initial coordinate of a UE 102. This initial estimate of the UE 102 coordinate can be used to identify sources of SLP measurements with potentially large error. A principle of this iterative approach is to apply certain pre-processing to select the best combination of SLP measurements used for estimation of UE coordinate and assess its quality. The described algorithm is transparent to the location calculation algorithm itself and can be applied to any positioning method.

In some embodiments, one or more of the following operations may be performed. The operations are referred to as operation #1-operation #6 for clarity in some descriptions herein, but embodiments are not limited by such references. In addition, one or more of operation #1-operation #6 may include multiple aspects, tasks, and/or concepts. It is understood that some embodiments may include one or more of those aspects, tasks and/or concepts, but may not necessarily include all of those aspects, tasks and/or concepts.

In operation #1, all SLP measurements for a target UE 102 of interest are signaled to the location server/application. Initial set of measurements available for user positioning is denoted as So. In operation #2, on each ith iteration, the location algorithm calculates the UE 102 coordinate $C_{UEi}$, using the set of measurements $S_i$. As a non-limiting example, a Taylor-series based location algorithm may be used.

In operation #3, once the UE coordinate is estimated at the first step, the cost function of SLP measurement is evaluated. The cost function of SLP measurement characterizes how well coordinate estimate is aligned with the radio-layer measurement of SLPs. For instance, in case of TOA positioning method, the UE 102 can estimate a distance to a gNB 105 from time of flight or roundtrip time measurements. The same distance can be estimated through knowledge of the gNB 105 coordinates and the estimate of the UE 102 coordinate. The difference between these two distance estimates characterizes alignment of radio-layer measurements of distance to gNB 105 with a resulting distance based on positioning. The lower value of the considered cost function, the better coordinate estimate and measurement are aligned with each other. In general, the cost function of SLP measurement depends on the type of the measured SLP. The following examples are given for TOF and (O)TDOA measurements. A non-limiting example of a cost function for TOF measurements location quality metric (measurement validation) is given below, wherein $\tau_k$ is a time of flight (TOF) measurement between the UE 102 and the kth BS (and/or the kth gNB 105), and c is the speed of light.

$$\Delta_{ik} = |f(C_{UEi}, C_k) - c\tau_k|,$$

A non-limiting example of a cost function for OTDOA measurements (measurement validation) is given below, wherein $C_r$ is reference BS coordinate(s), $C_k$ is the kth BS coordinate(s), $\tau_{rk}$ is an OTDOA measurement for the kth BS and the reference BS.

$$\Delta_{ik} = |f(C_{UEi}, C_r) - f(C_{UEi}, C_k) - c\tau_{rk}|,$$

The function $f(C, C_r)$ may be calculated using base station coordinates and estimated UE coordinate. $f(C, C_k)$ may be a Hermitian distance between UE 102 with coordinate C and kth BS with coordinates $C_k$. A non-limiting example is given below.

$$f(C, C_k) = \sqrt{(C_{UEi_x} - C_{kx})^2 + (C_{UEi_y} - C_{ky})^2 + (C_{UEi_z} - C_{kz})^2}$$

It should be noted that other functions can also be used. For instance, a square of the function $f(C_{UEi}, C_k)$ may be used in some embodiments. Other functions of the function $f(C_{UEi}, C_k)$ may be used, in some embodiments.

A non-limiting example 1200 in FIG. 12 illustrates an example of location delta (metric) calculation for TOA measurements.

In operation #4, an overall cost function for user coordinate can be calculated as the sum of the individual cost functions of given SLP measurements that were used for coordinate estimation. A non-limiting example is given below, wherein i is an iteration counter.

$$q_i = \Sigma_{k \in S_i} \Delta_{ik},$$

In operation #5, the SLP measurement with maximum cost function is excluded from the available set of SLP measurements $S_i$ to form a new set $S_{i+1}$.

In operation #6, one or more stopping criteria may be checked. In some embodiments, operation #2-operation #5 may continue unless the stopping criteria is met. Non-limiting examples of stopping criteria are given below. In some embodiments, one or more of those example stopping criteria and/or other criterion/criteria may be used.

In a non-limiting example, a stopping criterion may be met if a difference of an estimated coordinate quality for current iteration $q_i$ and an estimated coordinate quality for the previous iteration $q_{i-1}$ is less than a preconfigured value (such as $\epsilon$). For instance, the stopping criterion may be met if $(q_i - q_{i-1}) < \epsilon$.

In another non-limiting example, a stopping criterion may be met if a number of BSs used in the location procedure has reached a minimum or preconfigured value (such as N). In another non-limiting example, a stopping criterion may be met if a number of SLP measurements has reached a preconfigured value (such as M). In another non-limiting example, a stopping criterion may be met if a number of iterations (including but not limited to a pre-configured number of iterations).

The example 1300 in FIG. 13 illustrates a block diagram for a location algorithm.

In some embodiments, one or more of the techniques, operations and/or methods described herein may be applicable to communication systems with beam sweeping or beam scanning procedures or multiple transmission points (TPs) or a combination thereof. In such cases, a UE 102 may perform time of arrival or time-difference of arrival measurements (or measurement of any other SLP) for each beam or TX-RX beam pair and/or transmission points and report them back to the network location server or application layer instead of trying to combine or pre-process measurements to finally estimate any given SLP.

In some embodiments, one or more of the following may be considered to measure SLP: SLP are measured for each TX antenna port carrying PRS and reported independently for each port and TRP 107; for a given TX antenna port, SLP are measured using various RX antenna ports receiving PRS from one or multiple TX antenna ports; if a measurement node provides estimations in several time slots for several TX antenna ports, it may be requested, subject to its capability, to signal all calculated measurements obtained from each TX antenna port; if a measurement node provides estimation procedure for several RX antenna ports, it may be requested, subject to its capability, to signal calculated measurements obtained for each RX antenna port; if a measurement node provides estimations in several time slots for several TX antenna port, it may be requested, subject to its capability, to signal calculated measurements obtained from each TX antenna port; if a measurement node provides estimations in several time slots for several TX antenna ports and RX antenna ports, it may be requested, subject to its capability, to signal all calculated measurements obtained for each combination or a configured set of combinations of TX/RX antenna ports.

Non-limiting examples are illustrated in FIG. 14 for different combinations of TX/RX antenna ports.

In some embodiments, one or more of the following may be used: if multiple MIMO precoders are applied on TX side, the node can measure SLP for each TX precoder; if multiple MIMO precoders are applied on RX side, the measurement node may be requested, subject to its capability, to signal positioning measurements for each RX precoder; if multiple MIMO precoders are applied on transmitter and receiver side, the measurement node may be requested, subject to its capability, to signal positioning measurements for each combination of Tx/Rx pre-coders.

Non-limiting examples are illustrated in FIG. 15 for different combinations of TX/RX pre-coders.

Different embodiments may be concerned with the possibility to define RX beam sweeping procedures and involve them into the SLP measurement and reporting procedures. In some embodiments, a PRS configuration may include one or more of: PRS resource configuration (or reference resource) within a slot, periodicity in number of slots, an offset relative to System Frame Number (SFN) and/or other. Additionally, a number of consecutive slots $K_{PRS}$ repeated within the period may be configured. The term slot here is considered as an example and other time units may be considered such as frames, subframes, symbols and/or other, in some embodiments.

In some embodiments, RX beam sweeping may be used. In some embodiments, RX beam sweeping may be transparent to measurements and reporting (RX beam sweeping unaware). In some embodiments, a set of antenna ports for NR positioning reference signals (e.g. starting from 4000 or 5000 number) may be defined (which may be denoted as $\{X_{PRS}\}$ without limitation). In some embodiments, a particular antenna port may be associated with a PRS configuration (or reference resource).

In some embodiments, PRS antenna port to PRS resource configuration (or reference resource) mapping can be fixed in specification or configured by higher layer signaling. In an example, a set of PRS resource configurations (or reference resource) associated with a physical cell ID may be signaled by higher layer UE-specific or UE group common configuration message wherein the first PRS configuration is associated with the first PRS antenna port $X_{PRS,0}$, the second PRS configuration is associated with the second PRS antenna port $X_{PRS,1}$, and so on. Alternatively, each higher layer PRS configuration (or reference resource) message may convey an explicit antenna port index $X_{PRS,i}$ or a set of indexes associated with current configuration. In that case, several PRS configurations may be associated with the same antenna port index $X_{PRS,i}$. The measurements carried over the PRS (including RSTD, TOA, TDOA, RTT, RSRP) configured as per the procedures described in the above embodiments can be reported separately per each PRS configuration by a UE 102 to the location server or application if there is one-to-one mapping between PRS configuration and antenna port or per each PRS configuration and TX antenna port combination in case of one-to-many mapping.

In a non-limiting example 1600 in FIG. 16, a relation between PRS configurations, antenna ports, and SLP reports is illustrated. It may be assumed that in some cases of for example RSTD measurements, at least one of the PRS configurations in the set is the reference configuration which is used for differential SLP calculation, therefore the number of SLP measurement reports may be less than the number of configurations.

In some embodiments, a quasi-collocation (QCL) assumption could be configured between any SS-B/CSI-RS/TRS/PTRS/DMRS configuration/antenna port and PRS antenna ports by higher layer signaling. In particular, one of the QCL types may be defined between these signals: QCL-TypeA', QCL-TypeB', QCL-TypeC', QCL-TypeD'.

In some embodiments, RX beam may be used. In some embodiments, RX beam sweeping may be taken into account in measurements and reporting (RX beam sweeping aware). In some embodiments, a set of TX antenna ports for NR positioning reference signals (e.g. starting from 4000 or 5000 number) may be defined (which may be denoted as $\{X_{PRS}\}$ without limitation). A set of RX antenna states may be denoted without limitation as $\{Y_{PRS}\}$. Each antenna state may comprise antenna port and/or antenna precoding vector and/or antenna panel or a combination thereof. A particular TX antenna port or a set of antenna ports may be associated with a PRS configuration (or reference resource). In the same time, an SLP measurement carried over a PRS configuration (or reference resource) and corresponding TX antenna ports may be associated with particular RX antenna state or a set of RX antenna ports.

In some embodiments, PRS TX antenna port to PRS resource configuration (or reference resource) mapping can be fixed in specification or configured by higher layer signaling. In an example, a set of PRS resource configurations (reference resource) associated with a physical cell ID may be signaled by higher layer UE-specific or UE group common configuration message wherein the first PRS configuration (or reference resource) is associated with a first PRS TX antenna port $X_{PRS,0}$, the second PRS configuration (or reference resource) is associated with the second PRS antenna port $X_{PRS,1}$, and so on. Alternatively, each higher layer PRS configuration (reference resource) message may convey an explicit antenna port index $X_{PRS,i}$ or a set of indexes associated with current configuration. In that case, several PRS configurations (or reference resources) may be associated with the same antenna port index $X_{PRS,i}$. The SLP measurements for each combination of PRS configuration (reference resource) and TX antenna port are performed for the defined or configured set of RX antenna states and reported with respect to this combination.

In a non-limiting example 1700 in FIG. 17, a relation between PRS configurations, TX antenna ports, RX antenna states, and SLP reports is illustrated. It may be assumed that in some cases of for example RSTD measurements, at least one of the PRS configurations in the set is the reference configuration which is used for differential SLP calculation, therefore the number of SLP measurement reports may be less than the number of different combinations of PRS configurations, antenna port and states.

In some embodiments, a method of NR based positioning may comprise one or more of: configuration of PRSs or reference resources for estimation of signal location parameters (SLPs); coordinated transmission of PRSs on configured resources controlled by network from multiple transmission points; measurements of SLPs per each configured or detected PRS configuration; report of SLP measurements per each PRS configuration; iterative positioning procedure; and/or other.

In some embodiments, configuration of PRSs or reference resources for estimation of signal location parameters (SLPs) may comprise a resource descriptor in which PRS is transmitted characterized by stamp/ID, that can be configured by higher layer signaling and may be configured to UE for measurement and reporting. For instance the following ID may be used: time stamp/ID (i.e. measured time location): time window to be reported (may be configured, but also possibly to report UE autonomous reporting by means of a new time index, SFN, slot number, and/or symbol index, etc.); frequency stamp/ID (i.e. measured frequency location not only for different carrier frequencies but also for different frequency within the given channel bandwidth); TX/RX port stamp/ID (i.e. measured spatial domain information); Code ID—sequence or signal ID describing or associated with the specific PRS; and/or other.

In some embodiments, signal location parameters (SLP) are parameters of the signal that can be applied for the purpose of user positioning such as phase difference, time of arrival, time difference of arrival, propagation time/delays, angle of arrivals/departures, received reference signal powers and any other information that can be relevant to facilitate estimate of UE geographical coordinate.

In some embodiments, coordinated transmission of PRSs on configured resources controlled by network from multiple transmission points may comprise network configuring PRS configuration per transmission reception point, gNB, cell or beam so that transmission of PRS signals by different stations is orthogonal in time, frequency, spatial or code domains.

In some embodiments, in coordinated transmission of PRSs, a transmission schedule of PRSs is assigned and optimized by network to facilitate enhanced estimation of SLPs extracted from received PRSs.

In some embodiments, measurements of SLPs per each configured or detected PRS configuration comprises UE processing to estimate a set of SLPs and perform assessment of the conducted UE measurement quality. In some embodiments, measurements of SLPs such as received signal time difference (RSTD), time of arrival (ToA), angle of departure or arrival, beam index, etc. are measured per each TX antenna port, each RX antenna port or their combination including assessment of the conducted UE measurement quality.

In some embodiments, report of SLP measurements per each PRS configuration comprises MAC layer, RRC layer or upper layer signaling of SLP measurements to network location server or UE application layer to perform analysis of the UE coordinate. In some embodiments, report of SLP measurements includes the whole set of configured SLP measurements conducted on the predefined PRS resource within predetermined time interval. In some embodiments, an iterative positioning procedure comprises multi-step procedure with evaluation of cost functions for each individual SLP measurement and UE coordinate measurement. In some embodiments, a cost function for SLP measurement is used to determine whether given SLP measurement should be further used for location at the next iteration and this filters out the inaccurate SLP measurements. In some embodiments, a cost function for SLP measurement in case of TOF is represented as a function of the difference between distance measurements obtained from radio layer measurement and distance measurement obtained from the estimated coordinates. In some embodiments, a cost function for SLP measurement in case of TDOA/RSTD is represented as a function of the difference between relative distance measurements obtained from radio layer measurement and relative distance measurements obtained from the estimated coordinates. In some embodiments, a cost function for UE coordinate measurement is used to determine whether final iteration is reached. In some embodiments, a cost function for UE coordinate measurement is based on the individual sum of the cost functions for individual SLP measurements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a Next Generation Node-B (gNB), the apparatus comprising:
   memory; and
   processing circuitry, configured to:
   encode, for transmission, control signaling to configure transmission of position reference signals (PRSs) by a plurality of transmit-receive points (TRPs);
   decode, from a User Equipment (UE), one or more measurement reports that include sets of signal location parameters (SLPs), a set of SLPs for each of the TRPs, wherein each of the sets of SLPs includes an estimated propagation delay of one of the PRSs to the corresponding TRP;
   estimate a position of the UE based on the sets of SLPs excluding a set of SLPs for which a cost function is maximum,
   wherein processing circuitry determines the cost function based on a difference between a distance to the UE determined from the SLPs and a distance to the UE based on the estimated propagation delay included in the set of SLPs,
   wherein the memory is configured to store the sets of SLPs.

2. The apparatus according to claim 1, wherein the sets of SLPs are based on at least one or more of:
   a phase difference between one of the PRSs and a reference signal,
   a time of arrival of one or more of the PRSs,
   a time difference of arrival between two of the PRSs,
   an angle of arrival of one or more of the PRS, or
   a received reference signal power (RSRP) of one or more of the PRSs.

3. The apparatus of claim 2 wherein to estimate the position of the UE, the processing circuitry is configured to perform an iterative process,
   wherein for a current iteration of the iterative process, the processing circuitry is configured to:
   determine a current estimate of the position of the UE based on a current plurality of the sets of SLPs;
   for each of the sets of SLPs of the current plurality of the sets of SLPs, determine the cost function that compares:
   a distance based on a position of the corresponding TRP and the current estimate of the position of the UE, and
   a distance based on the estimated propagation delay included in the set of SLPs;
   wherein for a next iteration of the iterative process, the processing circuitry is configured to determine a next plurality of the sets of SLPs to be used to determine a next estimate of the position of the UE, and
   wherein for the next plurality of the sets of SLPs, the processing circuit is to exclude, from the current plurality of the sets of SLPs, the set of SLPs for which the cost function is maximum.

4. The apparatus according to claim 3, the processing circuitry further configured to:

for each of the sets of SLPs of the current plurality of the sets of SLPs, determine the distance based on the estimated propagation delay based on a product of the estimated propagation delay and a speed of light.

5. The apparatus according to claim 3, the processing circuitry further configured to:
for a set of SLPs that includes an estimate of a time difference of arrival of a first PRS from a reference TRP and a second PRS from the corresponding TRP:
determine the cost function for the set of SLPs based on a difference between:
a first distance between the current estimate of the position of the UE and the reference TRP,
a second distance between the current estimate of the position of the UE and the corresponding TRP, and
a product of the estimate of the time difference of arrival and a speed of light.

6. The apparatus according to claim 3, the processing circuitry further configured to:
in the current iteration of the iterative process, determine whether to terminate the iterative process and to output the current estimate of the position of the UE based on a comparison between:
a threshold, and
a difference between:
a sum of cost functions of the current plurality of the sets of SLPs, and
a sum of cost functions of another plurality of the sets of SLPs that was used to determine an estimate of the position of the UE during a previous iteration of the iterative process.

7. The apparatus according to claim 3, the processing circuitry further configured to:
in the current iteration of the iterative process, determine to terminate the iterative process and to output the current estimate of the position of the UE as the position of the UE if:
a number of sets of SLPs in the current plurality of the sets of SLPs is equal to a first threshold,
a number of base stations that support the TRPs corresponding to the sets of SLPs in the current plurality of the sets of SLPs is equal to a second threshold, or
a preconfigured number of iterations is used in the iterative process.

8. The apparatus according to claim 3, wherein:
during a first iteration of the iterative process, the current plurality of the sets of SLPs includes all of the sets of SLPs included in the one or more measurement reports.

9. The apparatus according to claim 3, the processing circuitry further configured to:
encode the control signaling to include information to configure the PRSs in accordance with:
time stamps based on transmission times of the PRSs,
frequency stamps based on transmission frequencies of the PRSs,
spatial domain stamps based on spatial multiplexing of the PRSs, or
code identifiers (IDs) of the PRSs.

10. The apparatus according to claim 3, the processing circuitry further configured to:
based on the cost functions, reduce a number of the sets of SLPs used to determine the next estimate of the position of the UE in comparison to a number of the sets of SLPs used to determine the current estimate of the position of the UE.

11. The apparatus according to claim 2, the processing circuitry further configured to:
encode the control signaling to configure coordinated orthogonal transmission of the PRSs by the TRPs, wherein the gNB is arranged to operate in accordance with a new radio (NR) protocol.

12. The apparatus according to claim 2, wherein:
the apparatus includes a transceiver to transmit the control signaling,
the processing circuitry includes a baseband processor to encode the control signaling.

13. A non-transitory computer-readable storage medium that stores instructions for execution by processing circuitry of a Next Generation Node-B (gNB), the operations to configure the processing circuitry to:
encode, for transmission, control signaling to configure transmission of position reference signals (PRSs) by a plurality of transmit-receive points (TRPs);
decode, from a User Equipment (UE), one or more measurement reports that include sets of signal location parameters (SLPs), a set of SLPs for each of the TRPs, wherein each of the sets of SLPs includes an estimated propagation delay of one of the PRSs to the corresponding TRP;
estimate a position of the UE based on the sets of SLPs,
wherein to estimate the position of the UE, a set of SLPs for which a cost function is maximum is excluded,
wherein processing circuitry determines the cost function based on a difference between a distance to the UE determined from the SLPs and a distance to the UE based on the estimated propagation delay included in the set of SLPs.

14. The non-transitory computer-readable storage medium according to claim 13, wherein to estimate the position of the UE, the processing circuitry is configured to perform an iterative process,
wherein for a current iteration of the iterative process, the processing circuitry is configured to:
determine a current estimate of the position of the UE based on a current plurality of the sets of SLPs;
for each of the sets of SLPs of the current plurality of the sets of SLPs, determine the cost function that compares:
a distance based on a position of the corresponding TRP and the current estimate of the position of the UE, and
a distance based on the estimated propagation delay included in the set of SLPs;
wherein for a next iteration of the iterative process, the processing circuitry is configured to determine a next plurality of the sets of SLPs to be used to determine a next estimate of the position of the UE, and
wherein for the next plurality of the sets of SLPs, the processing circuit is to exclude, from the current plurality of the sets of SLPs, the set of SLPs for which the cost function is maximum.

15. The non-transitory computer-readable storage medium according to claim 14 wherein:
the sets of SLPs of the next plurality of the sets of SLPs are included in the current plurality of the sets of SLPs, and
the next plurality of the sets of SLPs excludes, from the current plurality of the sets of SLPs, the set of SLPs for which the cost function is maximum.

16. The non-transitory computer-readable storage medium according to claim 14, the operations to further configure the processing circuitry to:
encode the control signaling to configure transmission of the PRSs on multiple transmit antenna ports for at least one of the TRPs; and in the current iteration of the iterative process, determine the current estimate of the position of the UE based further on sets of SLPs for each of the transmit antenna ports.

17. The non-transitory computer-readable storage medium according to claim 14, the operations to further configure the processing circuitry to:
encode the control signaling to configure:
transmission of the PRSs in accordance with multiple multiple-input multiple-output (MIMO) transmit pre-coders for at least one of the TRPs, or
reception of the PRSs in accordance with multiple MIMO receive pre-coders; and
in the current iteration of the iterative process, determine the current estimate of the position of the UE based further on sets of SLPs for each of the MIMO transmit pre-coders or MIMO receive pre-coders.

18. An apparatus of a User Equipment (UE), the apparatus comprising:
memory; and processing circuitry, configured to:
decode, from a Next Generation Node-B (gNB), control signaling to configure the UE for measurement reporting of signal location parameters (SLPs) of position reference signals (PRSs) transmitted from a plurality of transmit-receive points (TRPs);
configure a plurality of receive beams for receiving the PRSs indicated by the control signaling;
determine, for each receive beam of the plurality of receive beams, a set of SLPs for each TRP based on the received PRSs, the set of SLPs to include a propagation delay estimated by the UE;
encode, for transmission to the gNB, one or more of the measurement reports that include the sets of SLPs, the sets of SLPs for use by the gNB in determining a cost function based on a difference between a distance to the UE determined from the SLPs and a distance to the UE based on the estimated propagation delay included in the set of SLPs; and
decode, from the gNB, signaling that indicates a position of the UE based on the sets of SLPs and the estimated propagation delay, the position of the UE based on the sets of SLPs excluding a set of SLPs for which the cost function is maximum,
wherein the memory is configured to store information related to the sets of SLPs.

19. The apparatus according to claim 18, wherein the SLPs are based on:
a phase difference between one of the received PRSs and a reference signal,
a time of arrival of one of the PRSs,
a time difference of arrival between two of the PRSs,
an angle of arrival of one of the PRSs, or
a received reference signal power (RSRP) of one of the PRSs.

20. The apparatus according to claim 18, the processing circuitry further configured to:
determine a set of SLPs for each of a plurality of transmit antenna ports.

* * * * *